_United States Patent Office_

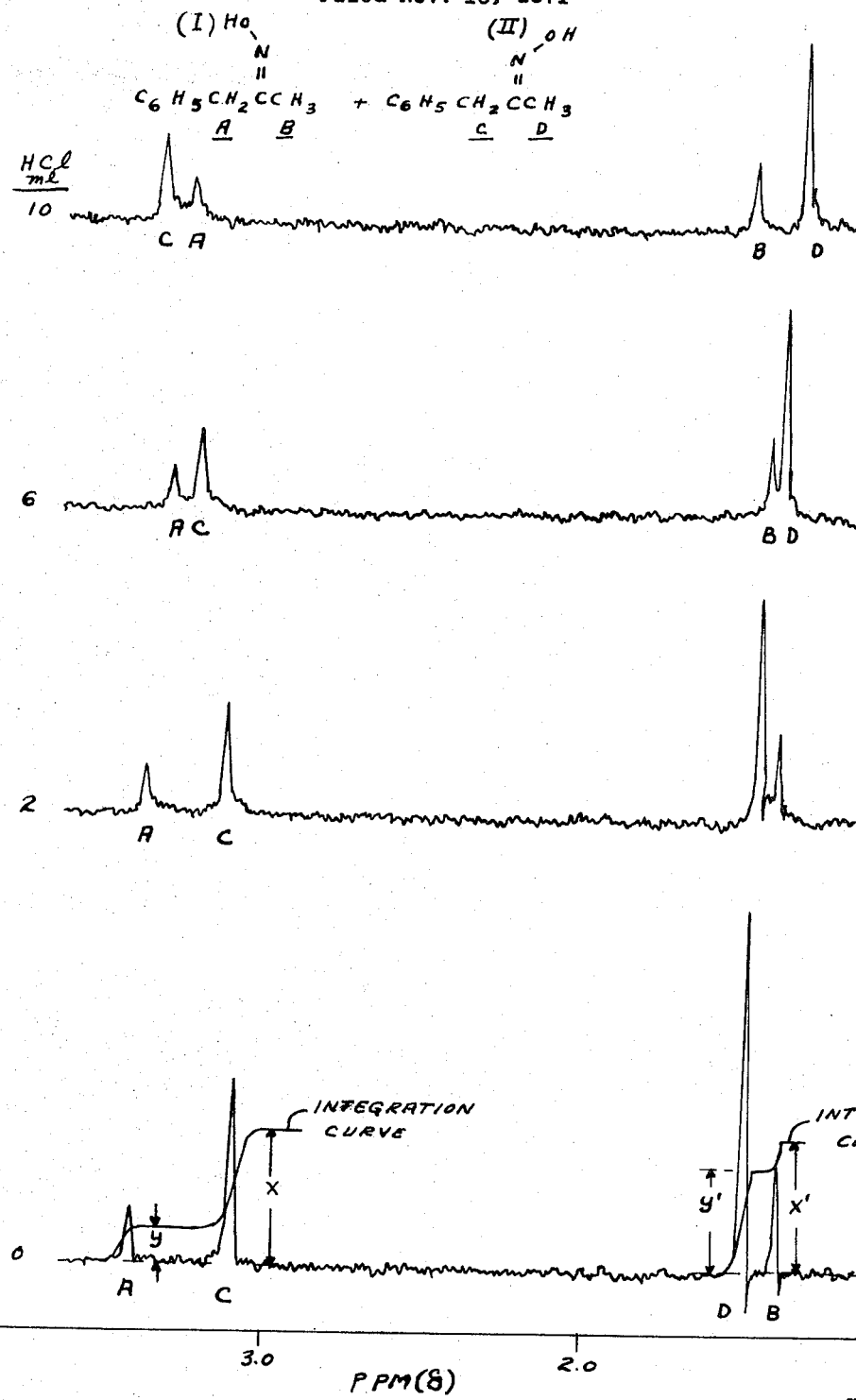

3,756,779
Patented Sept. 4, 1973

3,756,779
SPECTRAL ANALYSIS OF KETOXIMES
Roger E. Rondeau and B. Lawrence Fox, Dayton, Ohio, assignors to the United States of America as represented by the Secretary of the Air Force
Filed Nov. 16, 1971, Ser. No. 199,155
Int. Cl. G01n 27/78
U.S. Cl. 23—230 R                        14 Claims

ABSTRACT OF THE DISCLOSURE

A process is provided whereby hydrogen chloride gas is added to a sample of a ketoxime in solution in an aromatic solvent after whcih the same is subjected to nuclear magnetic spectroscopy. The spectrum obtained makes it possible to determine whether the sample is a single ketoxime or a mixture of ketoxime isomers as well as whether a single ketoxime has a syn or anti form or the relative amount of the syn and anti forms in isomeric mixtures.

FIELD OF THE INVENTION

This invention relates to a process for determining the stereochemistry of ketoximes by nuclear magnetic resonance (NMR). In one aspect it relates to a process whereby the relative amounts of individual isomers in an isomeric mixture of ketoximes can be determined.

BACKGROUND OF THE INVENTION

The classical method for determining the stereochemistry of ketoximes is based upon the preferential migration of the group anti to the oximino hydroxyl group during the Beckmann rearrangement. The shortcomings of this method for stereochemical assignment are well known (W..Z. Heldt, Org. React., 11, 1, 1960). NMR studies have recently provided alternate and more generally reliable techniques for assigning configuration. In the operation of a NMR spectrometer, a tube containing a sample to be analyzed is positioned between the pole faces of a direct current electromagnet or a permanent magnet whose gap can be verified. An oscillating radio frequency field is imposed at right angles to the magnetic field. A separate radio frequency coil in the form of a few turns of wire wound tightly around the sample tube serves as the receiver coil to pick up the resonant signal from the sample. When nuclear transitions are induced, energy is absorbed from the receiver coil, causing the voltage across the receiver coil to drop. After this change is amplified and detected, the resulting direct current voltage is placed on an oscilloscope. The NMR spectrum, a pattern of intensity as a function of frequency, is thereby produced. An interpretation of the spectrum makes it possible to determine the nuclei present in the molecule and their relationship to one another.

In one method for determining the stereochemistry of ketoximes by NMR spectroscopy, spectra were obtained of samples of ketoximes in carbon tetrachloride and in benzene. The magnitude of the benzene-induced changes in chemical shifts was then taken as an indication of configuration. In general, the prior art methods are laborious and expensive to perform.

It is an object of this invention, therefore, to provide an improved process for the spectral analysis of ketoximes.

Another object of the invention is to provide a process for the spectral analysis of a mixture of isomeric ketoximes whereby the relative amount of each isomer in the mixture can be determined.

Other objects and advantages of the invention will become apparent to those skilled in the art upon consideration of the accompanying disclosure and the drawing which shows spectra of a solution of a mixture of isomeric phenylacetoximes containing varying amounts of hydrochloric acid vapor.

SUMMARY OF THE INVENTION

Broadly speaking, the present invention resides in a process for the spectral analysis of a ketoxime by nuclear magnetic resonance which comprises adding hydrogen chloride gas to a solution of the ketoxime in an aromatic solvent. In a more specific embodiment, the process of this invention comprises the steps of (1) preparing a solution of a ketoxime in an aromatic solvent, the solution containing a reference compound; (2) recording the NMR spectrum of the solution; (3) adding hydrogen chloride gas to the solution; and (4) recording the NMR spectrum of the solution containing hydrogen chloride gas.

The addition of the hydrogen chloride gas to a solution containing a mixture of ketoxime isomers causes the $\alpha$ protons syn to the hydroxyl group of the oxime radical to shift to a higher field (upfield) while the $\alpha$ protons anti to the hydroxyl group are caused to shift to a lower field (downfield). It is thus possible to determine whether the product undergoing spectral analysis is a mixture of isomeric ketoximes. Furthermore, since it is known how the protons shift, i.e., $\alpha$ protons syn to the hydroxyl group to a higher field and $\alpha$ protons anti to the hydroxyl group to a lower field, it is thereby possible to assign protons with certainty to specific isomers from the observed proton shifts. Also, the areas under the absorption peaks of the $\alpha$ protons indicate the particular isomer that predominates in the isomeric mixture. In other words if the height of the integral curve of the signals or absorptions for the protons of one isomer is greater than the height of the integral curve of the signals for the corresponding protons of the other isomer, the first isomer is the major component of the mixture.

In another embodiment, the process of this invention makes it possible to determine the relative quantity of each isomer in the mixture without resorting to a physical separation. This is accomplished by integrating the areas under the absorptions of corresponding protons. From the resulting integration curves, the relative quantity of each isomer in the mixture can be readily determined. The relative quantity can also be determined by actually cutting out the areas defined by the traces of the peaks of corresponding protons. The weight of each individual paper cutout divided by the total weight of the cutouts gives the percent of each isomer present in the mixture. In the practice of this embodiment it is preferred to use the spectrum of the sample which does not contain hydrogen chloride gas.

When the solution contains a single ketoxime, i.e., stereoisomers are not present, there is only a single resonance for each set of protons alpha to the oxime group whereas with an isomeric mixture there are two resonances for each set of protons alpha to the oxime group. With a solution containing a single ketoxime, the absorption peak or peaks, depending on whether there are one or two sets of $\alpha$ protons present, will shift upfield or downfield upon addition of the hydrogen chloride gas depending on which α protons are syn or anti to the hydroxyl radical of the oxime group.

The ketoximes that can be analyzed in accordance with the process of this invention can be represented by the following structural formula:

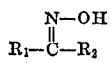

wherein $R_1$ and $R_2$ are radicals individually selected from the group consisting of hydrogen, alkyl, alkaryl, aralkyl, aryl, cycloalkyl, cycloalkenyl, alkenyl and substituted derivatives thereof, at least one of the $R_1$ and $R_2$ radicals having a methyl, methylene or methyne group adjacent to the oxime group, i.e., with its carbon atom attached to the carbon atom in the above formula. The aforementioned $R_1$ and $R_2$ can be substituted with any substituent so long as it does not react with hydrogen chloride and at least one of the $R_1$ and $R_2$ groups has a proton in the α position after the substitution. The number of carbon atoms that may be present in the $R_1$ and $R_2$ groups is immaterial insofar as the practice of this invention is concerned. This is the case since it is the position of the α protons of the methyl, methylene or methyne groups relative to the hydroxyl radical of the oxime group that is determined, and the number of carbon atoms in the $R_1$ and $R_2$ groups does not affect this determination. However, as a practical matter, the number of carbon atoms in the $R_1$ and $R_2$ groups usually is in the range of 1 to 20, inclusive.

Examples of ketoximes according to the foregoing formula include 2-propanone oxime, 2-pentanone oxime, 3-pentanone oxime, 3-hexanone oxime, 4-heptanone oxime, 3-octanone oxime, acetophenone oxime, phenylacetone oxime, cyclobutanone oxime, cycloheptanone oxime, cyclohexanone oxime, 2-cyclohexenone oxime, p-acetophenone oxime, methylbenzoin oxime, phenylbenzyl ketoxime, 3-phenyl-2-butanone oxime, deoxybenzoin oxime, p-bromoacetophenone oxime, isophorone oxime, and the like. As will be apparent to those skilled in the art, with a few exceptions, there are two isomeric forms of the aforementioned compounds, one with the α protons syn to the hydroxyl radical of the oxime group and the second with the α protons anti to the hydroxyl radical. When referring herein, to "the ketoxime," it is to be understood that the term covers a single ketoxime as well as a mixture of isomers.

Conditions for resonance are expressed in terms of a difference (chemical shift) between the field necessary for resonance in the sample and in an arbitrarily chosen reference material. Thus, samples to be subjected to nuclear magnetic resonance conventionally contain a reference material having only a single resonance line. It is usually preferred to use tetramethyl silane (TMS) as the reference material, but other compounds with single sharp peaks can be utilized provided their own absorption peak does not interfere with the spectrum. The reference compound can be added to the ketoxime, to the solvent, or to the solution of the ketoximes. The only requirement is that it be present in the sample tube during the analysis.

In general, solvents suitable for use are aromatic compounds in which the ketoximes are soluble. It has been found that benzene is a particularly useful solvent. Examples of other aromatics that may be employed include deuterated benzene, toluene, deuterated toluene, the xylenes, and the deuterated xylenes. It is to be understood that the solvent used must not have absorption peaks that will interfere with the spectrum. For this reason benzene and the deuterated aromatics are the preferred solvents. Moreover, other compounds that may be a solvent for the ketoxime, such as chloroform, have been found to be unsuitable or to produce inferior results.

In carrying out the process of this invention, a solution of the ketoxime is initially prepared. As mentioned above, this solution contains a reference material which can be added to the solvent, the ketoxime or the solution. The sample solution generally contains from about 5 to 15 weight percent of the ketoxime, based on the weight of the solvent. In the event that an amount of the ketoxime in the aforementioned range does not go into solution, the amount added is that which is sufficient to provide a saturated solution. The amount of the reference material usually constitutes from about 1 to 4 volume percent of the solution.

After preparation of the sample, it is subjected to nuclear magnetic resonance and the spectrum is recorded. Thereafter, hydrogen chloride gas is added to the sample solution in increments and after the addition of each increment the NMR spectrum is recorded. This procedure is followed until the changes in chemical shifts of the α protons are large enough to be unequivocally recognized and measured. The total amount of the hydrogen chloride gas that is added and necessarily the number of increments will depend, at least to some degree, upon the ketoxime that is being analyzed. The total amount of the gas that is added is usually in the range of about 1.0 to 10 milliliters of hydrogen chloride gas per milliliter of solution. The source of the hydrogen chloride gas can be the vapor of hydrochloric acid in which event the amount of the vapor added will depend upon the concentration of the acid.

A better understanding of the invention can be obtained by considering the following illustrative example which is not intended, however, to be unduly limitative of the invention.

EXAMPLE

A series of experiments was conducted in which NMR spectra were obtained at 60 mHz. with solutions containing 0.5 ml. of benzene and 10 weight percent of various ketoximes, based on the weight of each solution. The procedure followed in each experiment was to add the solution to the sample tube of a Varian HA60-IL spectrometer after which two drops of TMS was added as the reference material.

The sample tube containing the above-described solution was placed in the spectrometer and the NMR spectrum of the sample was recorded. Also, the chemical shift ($V_O$) of the α protons was measured. Thereafter, hydrochloric acid vapor was withdrawn from the atmosphere in a concentrated (38%) hydrochloric acid reagent bottle, using a syringe having a glass tube of sufficient length to reach the bottom of the NMR sample tube. The gas was then slowly bubbled through the sample. After each successive addition of 2-, 4- and 4-milliliter increments of the hydrochloric acid gas, the spectrum was recorded and chemical shift of each α proton ($V_{HCl}$) was measured.

The ketoximes that were used in the experiments corresponded to the following structural formula:

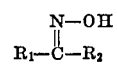

In the table below, there are listed the various ketoximes that were analyzed by indicating the radicals corresponding to $R_1$ and $R_2$ in the formula. Also, included in the table are the measured chemical shifts for the α protons that have been underlined in the various radicals. The dashes in the table indicate differences of less than 1 Hz. that are considered to be insignificant and are, therefore, not recorded.

TABLE

| Compound number [2] | R₁ | R₂ | V₀ Hz. from TMS | V₀-V_HCl, Hz.[1] 2 ml. | 6 ml. | 10 ml. |
|---|---|---|---|---|---|---|
| 1 | C₆H₅ | CH₃ | 124.7 | 1.3 | 3.4 | 5.0 |
| 2 | C₆H₅ | C₆H₅$\overline{CH_2}$ | 245.7 | 1.4 | 3.5 | 4.9 |
| 3 | C₆H₅CH(OCH₃) | C₆H₅ | 308.7 | −24.4 | −49.5 | −55.3 |
| 4 | C₆H₅$\overline{CH}$CH₃ | CH₃ | 100.2 | 1.1 | 3.0 | 4.5 |
| 4 | C₆H₅CHCH₃ | $\overline{CH_3}$ | 206.3 | −3.4 | −10.2 | −17.0 |
| 5 | CH₃$\overline{CH_2}$ | CH₃CH₂ | 136.6 | ........ | 2.2 | 3.3 |
| 5 | CH₃CH₂ | CH₃$\overline{CH_2}$ | 118.6 | ........ | −1.5 | −3.1 |
| 6 | n-C₃$\overline{H_7}$ | CH₃ | 102.8 | ........ | 1.7 | 2.2 |
| 6 | CH₃ | n-$\overline{C_3H_7}$ | 97.4 | ........ | ........ | −2.0 |
| 7 | C₆H₅$\overline{CH_2}$ | CH₃ | 99.4 | 3.5 | 6.5 | 10.3 |
| 7 | C₆H₅CH₂ | $\overline{CH_3}$ | 196.5 | ........ | −6.7 | −14.0 |
| 8 | CH₃ | C₆H₅CH₂ | 215.8 | 3.2 | 7.3 | 10.7 |
| 8 | CH₃ | C₆H₅$\overline{CH_2}$ | 93.4 | ........ | −1.9 | −5.1 |
| 9 | | CH₂(CH₂)₃CH₂ | 147.5 | 1.0 | 2.7 | 9.1 |
| 9 | | CH₂(CH₂)₃$\overline{CH_2}$ | 126.2 | ........ | −2.2 | −4.3 |
| 10 | CH=C(C$\overline{H_3}$)CH₂C(CH₃)₂CH₂ | | 367.5 | −1.7 | −4.5 | −7.3 |
| 10 | $\overline{CH}$=C(CH₃)CH₂C(CH₃)₂CH₂ | | 147.0 | 1.5 | 3.5 | 5.5 |

[1] Chemical shift in benzene solution minus chemical shift after treatment with concentrated hydrochloric acid vapor. Positive values indicate an upfield shift while negative values indicate a downfield shift.

[2] Where stereoisomeric mixtures were analyzed, the first entry is the principal isomer, i.e., it was the major component of the mixture.

From the data in the foregoing table, the particular isomer being analyzed can be readily determined. For example, referring to Compound No. 1, it is seen that the $(V_O-V_{HCl})$ value was positive, indicating an upfield shift of the protons. Furthermore, the fact that the shift was upfield further indicates that the methyl protons are syn to the hydroxyl group of the oxime radical. Thus, Compound No. 1 has the following formula:

$$C_6H_5-\underset{\underset{\text{N-OH}}{\|}}{C}-CH_3$$

In the case of Compound No. 3, the $(V_O-V_{HCl})$ value was negative, indicating a downfield shift of the proton. Thus, the methyne proton of Compound No 3 is anti to the hydroxyl group, indicating that the compound has the following formula:

$$C_6H_5CH(OCH_3)-\underset{\underset{\text{N-OH}}{\|}}{C}-C_6H_5$$

Reference is now made to the drawing which shows the actual spectra obtained without and with the addition of specific amounts of hydrochloric acid vapor to a benzene solution of a stereoisomeric mixture of phenylacetone oximes (Compound No. 7). The formulas, designated I and II, for the isomers are shown, and the α protons in the formulas have been lettered A, B, C and D. The absorption peaks of the spectra for the protons have been correspondingly lettered. Originally when the first spectrum was obtained for the sample in the absence of HCl gas, it was not known which of the protons should be assigned to the different peaks. It was only known that each pair of absorption peaks indicated the same α protons present in each of the isomers and that from the region of the absorption the right-hand pair of peaks should be assigned to the B and D protons and the left-hand pair of peaks to the A and C protons. As the spectra were recorded after the addition of the increments of HCl vapor, peak transpositions occurred as is evident from an examination of the spectra. Thus, referring to the lower spectrum, the protons producing the left absorption peak of the right-hand pair of peaks shifted upfield as seen from the top spectrum. This direction of shift indicates that these protons are syn to the hydroxyl group and, therefore, this peak has been assigned to the D protons. The other peak of the pair shifted downfield, indicating that this signal is due to protons anti to the hydroxyl group, i.e., the B protons. A similar analysis of the left-hand pair of absorption peaks serves to identify protons A as being syn to the hydroxyl group and protons C as being anti to the hydroxyl group.

It is seen from the drawing that the area under the absorption peaks for the C and D protons is greater than the area under the absorption peaks for the A and B protons. Accordingly, isomer II shown in the drawing is the principal isomer of the stereoisomeric mixture.

As mentioned above, initially it was not possible to assign specific protons to absorption peaks. From the foregoing discussion, it is seen that the protons can now be assigned, as shown, to the spectrum obtained with the sample which did not contain HCl vapor.

In determining the percentages of each isomer by integration of absorption areas of corresponding α protons of each isomer, it is preferred to use the spectrum of the sample that does not contain HCl gas. This is because of the possibility that the HCl gas may induce isomerization, thereby introducing an error in the determination, a fact that emphasizes the importance of identifying the absorption peaks of the spectrum that is free of HCl gas. Referring still to the drawing, there is shown the traces of the integration curves of the absorption areas from protons A and C and protons B and D as may be determined by the spectrometer. Using the left-hand integration curve, the weight percentages of isomers I and II in the mixture are equal, respectively, to $$\frac{y}{x} \text{ and } \frac{x-y}{x}$$

By measurement, $x$ equals 24 mm. and $y$ equals 6 mm. Thus, the mixture contains 25 weight percent of isomer I

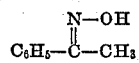

and 75 weight percent of isomer II

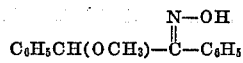

The weight percentages of the isomers can also be determined by using the right-hand integration curve. As shown by this curve, the weight percentages of isomers I and II are equal, respectively, to $$\frac{x'-y'}{x'} \text{ and } \frac{y'}{x'}$$

By measurement, $x'$ equals 24 mm. and $y'$ equals 18 mm. Thus, the mixture contains 25 weight percent $$\left(\frac{24-18}{24}\right)$$

of isomer I and 75 weight percent $$\left(\frac{18}{24}\right)$$

of isomer II.

Following the procedures described hereinbefore, the stereochemistry of the other ketoximes can be readily determined. Furthermore, the principal isomer as well as the actual percentage of each isomer of the stereoisomeric mixture can be ascertained.

From the foregoing data it is seen that the process of this invention makes it possible to spectrally separate and identify the isomers of ketoximes as well as to determine the structure of a single ketoxime isomer. In the usual practice of the invention, the hydrogen chloride gas is added in increments, and the several spectra obtained are compared. However, it is to be understood that it is not intended to limit the invention to the addition of any particular number of increments. For example, it is within the scope of the invention to add initially an amount of hydrogen chloride gas sufficient to cause the desired shift of the $\alpha$ protons.

As will be evident to those skilled in the art, various modifications of this invention can be made in view of the foregoing disclosure without departing from the spirit or scope of the invention.

We claim:

1. A process for the spectral analysis of ketoximes by nuclear magnetic resonance which comprises adding hydrogen chloride gas to a solution of a ketoxime in an aromatic solvent containing a reference material; and recording a nuclear magnetic resonance spectrum of the solution containing hydrogen chloride.

2. The process according to claim 1 in which said ketoxime has the following structural formula:

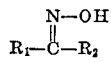

wherein $R_1$ and $R_2$ are radicals individually selected from the group consisting of hydrogen, alkyl, alkaryl, aralkyl, aryl, cycloalkyl, cycloalkenyl, and alkenyl, at least one of the $R_1$ and $R_2$ radicals having a methyl, methylene or methyne group with its carbon atom attached to the carbon atom in the above formula.

3. The process according to claim 2 in which said aromatic solvent is selected from the group consisting of benzene, deuterated benzene, toluene, deuterated toluene, xylenes and deuterated xylenes, and said reference material is tetramethyl silane.

4. The process according to claim 2 in which said solution contains about 5 to 15 weight percent of ketoxime, based on weight of solvent; the amount of said reference material is from about 1 to 4 volume percent of the solution; and the amount of hydrogen chloride gas is in the range of about 1.0 to 10 milliliters per milliliter of said solution.

5. The process according to claim 2 in which said ketoxime is acetophenone oxime.

6. The process accordong to claim 2 in which said ketoxime is phenylacetone oxime.

7. The process according to claim 2 in which said ketoxime is an isomeric mixture of phenylacetone oximes.

8. The process according to claim 2 in which said ketoxime is an isomeric mixture of cyclohexanone 9. The process according to claim 2 in which said ketoxime is an isomeric mixture of isophorones oximes.

10. The process according to claim 2 in which said ketoxime is an isomeric mixture of 2-pentanone oximes.

11. The process according to claim 2 in which said ketoxime is an isomeric mixture of methylbenzoin oximes.

12. A process for the spectral analysis of ketoximes by nuclear magnetic resonance which comprises forming a solution of a ketoxime in an aromatic solvent, said solution containing a reference material; recording a nuclear magnetic resonance spectrum of said solution; adding hydrogen chloride gas to said solution; and recording a nuclear magnetic resonance spectrum of the solution containing hydrogen chloride, said ketoxime having the following structural formula:

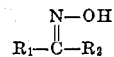

wherein $R_1$ and $R_2$ are radicals individually selected from the group consisting of hydrogen, alkaryl, aralkyl, aryl, cycloalkyl, cycloalkenyl, and alkenyl, at least one of the $R_1$ and $R_2$ radicals having a methyl, methylene or methyne group.

13. The process according to claim 12 in which the amount of hydrogen chloride gas added is sufficient to cause measurable shifts of absorption peaks attributable to $\alpha$ protons of said methyl, methylene or methyne groups, an upfield shift indicating protons syn to the OH radical of said ketoxime and a downfield shift indicating protons anti to the OH radical of said ketoxime.

14. The process according to claim 13 in which said ketoxime is a mixture of ketoxime isomers, the absorption areas of the corresponding $\alpha$ protons of the spectrum first recorded are integrated; and the height of each integration curve above a base line is measured, the smaller height divided by the greater height representing the percentage of the minor isomer contained in the isomeric mixture.

References Cited

UNITED STATES PATENTS 3,464,796    9/1969    Friedlander _____ 23—230 R
3,700,410    10/1972    Sievers _____ 23—230 R

OTHER REFERENCES

Fox et al.: Assignment of Stereochemistry by a Nuclear Magnetic Resonance Method, J. Org. Chem., vol. 35, No. 12, pp. 4234–6 (December 1970).

J. C. Martin: NMR Spectroscopy as an Analytical Tool in Organic Chemistry, J. of Chem. Eduction, vol. 38, No. 6, pp. 286–91 (June 1961).

Ward et al.: Application of Nuclear Magnetic Resonance to Quantitative Analysis of Mixtures of Organic Peroxides, Hydroperoxides, and Alcohols, Aval. Chem., vol. 41, No. 3, pp. 538–40 (March 1969).

JOSEPH SCOVRONEK, Primary Examiner

U.S. Cl. X.R.

23—230 M; 324—0.5 A